March 26, 1940.
S. F. TORSTENSSON
2,194,530
VEHICLE REFRIGERATION
Filed Jan. 5, 1938
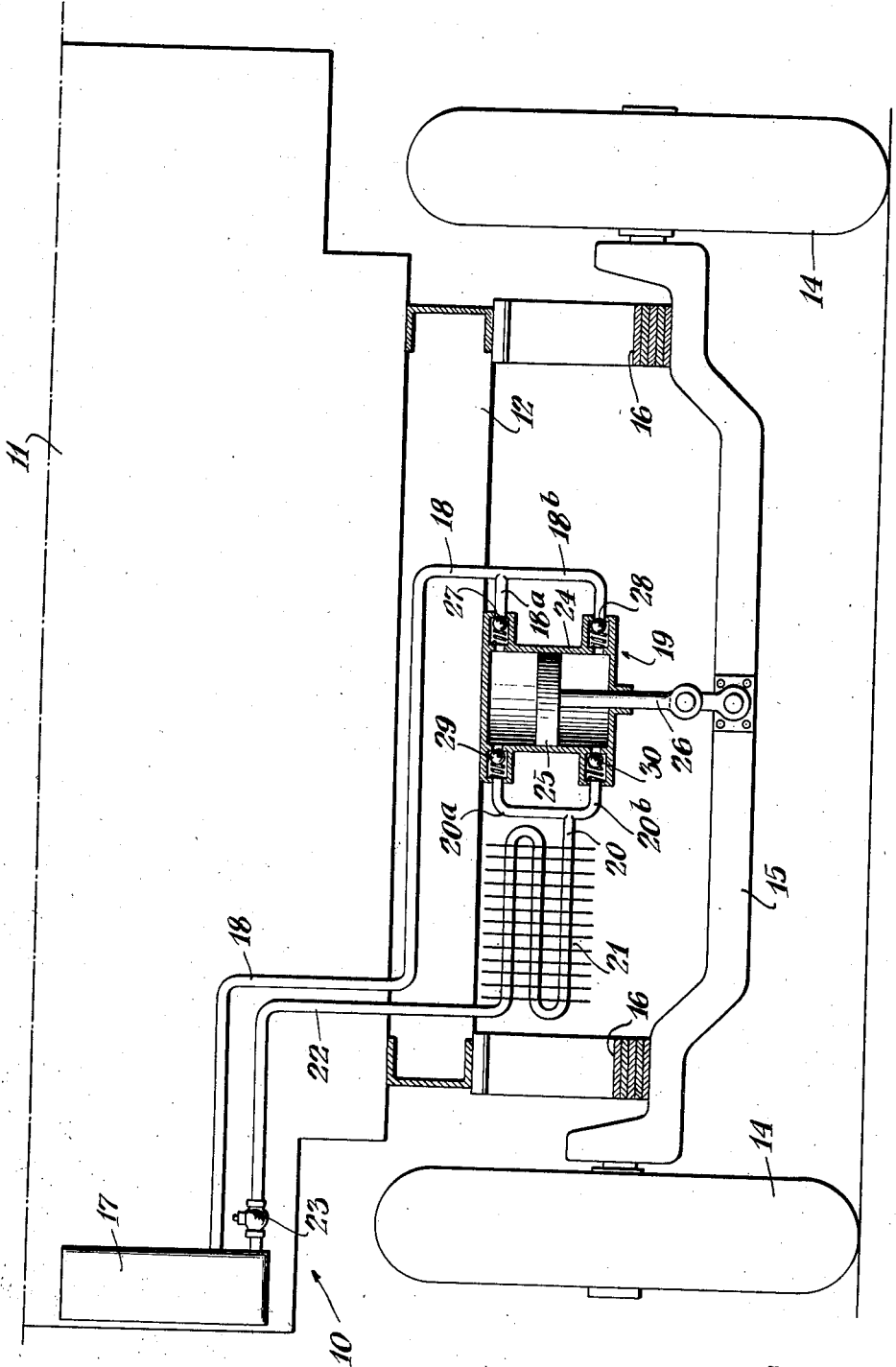
INVENTOR.
Sture Focke Torstensson
BY
E. A. Fenander
his ATTORNEY.

Patented Mar. 26, 1940

2,194,530

UNITED STATES PATENT OFFICE 2,194,530

VEHICLE REFRIGERATION

Sture Folke Torstensson, Stockholm, Sweden, assignor, by mesne assignments, to Servel, Inc., New York, N. Y., a corporation of Delaware Application January 5, 1938, Serial No. 183,423

2 Claims. (Cl. 62—115)

My invention relates to vehicle refrigeration, and more particularly to apparatus for producing refrigeration in connection with vehicles, such as, for example, automobiles and the like.

It is an object of the invention to provide an improvement whereby refrigeration apparatus mounted on a vehicle can be operated by relative movement of parts of the vehicle. I accomplish this by providing an automobile or like vehicle with refrigeration apparatus of a compression type, the compressor of such apparatus being so constructed and arranged that operation thereof is effected by ordinary movements of parts of the automobile which occur and take place while the automobile is in motion.

The invention, together with the above and other objects and advantages thereof, will be more fully understood upon reference to the following description and accompanying drawing forming a part of this specification, and of which the single figure illustrates more or less diagrammatically an automobile provided with refrigeration apparatus embodying the invention.

Referring to the drawing, an automobile 10 includes a body 11 mounted on a frame or chassis 12. The automobile is adapted to be driven by an internal combustion engine (not shown) and provided with wheels 14 which are secured to the front and rear axles and of which only the front axle 15 is shown. The axle 15 supports the weight of the forward part of the automobile through springs 16.

The automobile is provided with refrigeration apparatus of a compression type including an evaporator or cooling element 17 which may be located in the body 11. During operation of the refrigeration apparatus refrigerant evaporates in cooling element 17 to produce a refrigerating effect, and the refrigerant vapor is withdrawn through conduit 18 by a compressor 19 embodying the invention.

In compressor 19 the refrigerant vapor is compressed and discharged through a conduit 20 into an air-cooled condenser 21 which may be located below the body 11. The refrigerant is condensed in the condenser 21 and flows therefrom through conduit 22 into cooling element 17 where it is again evaporated and the refrigerating cycle repeated. In conduit 22 is provided a reducing valve 23 or other suitable device to maintain the desired difference of pressure between cooling element 17 and condenser 21.

In accordance with my invention, the compressor 19 is so constructed and arranged that operation thereof is effected by energy developed by the automobile while it is in motion, and which energy is usually dissipated in the springs and shock absorbers. The compressor 19 includes a cylinder 24 which may be secured at its upper end to a cross member of the chassis or frame 12 which, together with body 11, makes up the sprung weight of the automobile. A piston 25 movable within cylinder 24 is connected to a piston rod 26 which extends through an opening in the lower end of the cylinder and is secured to the axle 15 which makes up the unsprung weight of the automobile.

One part 18a of conduit 18 is in communication with an upper part of cylinder 24 and another part 18b thereof is in communication with a lower part of the cylinder. Similarly, one part 20a of conduit 20 is in communication with an upper part of cylinder 24 and another part 20b thereof is in communication with a lower part of the cylinder. In conduits 18a and 18b are provided inlet valves 27 and 28 and in conduits 20a and 20b are provided outlet valves 29 and 30.

When the automobile 10 is being driven the body 11 and chassis 12 will tend to move toward and away from axle 15 due to irregularities in a roadway over which it passes. When piston 25 moves upward relative to cylinder 24 due to relative movement of chassis 12 and axle 15, inlet valve 27 is closed and outlet valve 29 is opened whereby refrigerant vapor in the upper part of cylinder 24 is compressed and discharged through part 20a of conduit 20 into condenser 21. During such upward movement or the upward stroke of piston 25, inlet valve 28 is opened and outlet valve 30 is closed whereby refrigerant vapor is withdrawn from cooling element 17 through part 18b of conduit 18 into the lower part of the cylinder.

During the subsequent downward stroke or movement of piston 25 relative to cylinder 24 due to relative movement between the resiliently connected chassis 12 and axle 15, inlet valve 28 is closed and outlet valve 30 is opened, whereby refrigerant vapor in the lower part of the cylinder is compressed and discharged through part 20b of conduit 20 into condenser 21. During such downward stroke of piston 25, inlet valve 27 is opened and outlet valve 29 is closed whereby refrigerant vapor is withdrawn from cooling element 17 through part 18a of conduit 18 into the upper part of the cylinder.

From the foregoing it will be understood that compressor 19 is double acting and that with the downward and upward strokes of piston 25 relative to cylinder 24, refrigerant vapor is simultaneously withdrawn from cooling element 17 and compressed refrigerant vapor is discharged into condenser 21. When the automobile 10 is in motion the chassis or frame 12 will constantly be moving up and down relative to axle 15 due to irregularities in the surface of a roadway and thereby effect relative movement of cylinder 24 and piston 25. If desired, a plurality of compressors may be provided instead of a single compressor, as shown in the drawing. Also, the cylinder 24 may be secured to the axle 15 and the piston 25 connected to the chassis or frame 12.

It will now be understood that energy developed during movement of an automobile which is normally dissipated and lost through the springs and shock absorbers is utilized by the present invention to effect operation of refrigeration apparatus. In addition, a compressor of the character described may be effectively employed as a shock absorber and may replace the usual type of shock absorber in which energy or power is lost. In any particular case, if the available amplitude of motion is relatively small, compression may be effected by providing suitable lever mechanism to increase the available amplitude of motion whereby the strokes of the piston relative to the cylinder are of the desired length.

While I have shown and described a particular embodiment of the invention, I do not wish to be limited to the particular arrangements set forth, and I therefore aim in the following claims to cover all modifications and changes that fall within the true spirit and scope of the invention.

What is claimed is:

1. In combination in a vehicle having supporting means; a vehicle body, resilient means for supporting said body on said supporting means; a refrigeration system containing refrigerant fluid and including a condenser operative to condense compressed refrigerant fluid, a cooling element and a refrigerant compressor for circulating the refrigerant fluid within the system, said compressor being so connected to said body and to said supporting means that relative movement between said body and said supporting means will operate the compressor to compress said refrigerant fluid; said compressor also being arranged to serve as a shock absorber.

2. In combination in a vehicle having supporting means; a vehicle body, resilient means for supporting said body on said supporting means; a refrigeration system containing refrigerant fluid and including a condenser operative to condense compressed refrigerant fluid, a cooling element and a refrigerant compressor for circulating the refrigerant fluid within the system, said compressor being so connected to said body and to said supporting means that relative movement between said body and said supporting means will operate the compressor to compress said refrigerant fluid.

STURE FOLKE TORSTENSSON.